3,823,133
METHOD FOR PREPARING ADSORPTIVE CELLULOSE ETHERS

Louis S. Hurst and Norman E. Lloyd, Clinton, Iowa, assignors to Standard Brands Incorporated, New York, N.Y.
No Drawing. Continuation-in-part of abandoned application Ser. No. 254,513, May 18, 1972. This application May 17, 1973, Ser. No. 361,361
Int. Cl. C08b *11/00*
U.S. Cl. 260—231 A          11 Claims

ABSTRACT OF THE DISCLOSURE

Adsorptive cationic cellulose is prepared by introducing cationic substituents onto cellulose in an alkaline aqueous solution of a salt of a strong acid and a strong base. The derivatized cellulose has a high adsorptive capacity for certain proteinaceous materials, e.g., enzymes.

THE INVENTION

This application is a continuation-in-part of application Ser. No. 254,513 filed May 18, 1972, now abandoned.

This invention relates to a process for preparing adsorptive cellulose ethers. More particularly, the invention relates to a process for preparing adsorptive cellulose ethers having cationic substituents.

Cellulose can be derivatized to form insoluble materials having the advantages of rigidity, inertness, large surface area, and, due to its open, porous structure, high adsorptive capacity.

Cellulose occurs in the form of anhydroglucose units bound together by glucosidic linkages. Each anhydroglucose unit has at least three free hydroxyl groups capable of undergoing substitution reactions to form ethers, esters, etc. The average number of hydroxyl groups substituted per anhydroglucose unit of cellulose is known as the degree of substitution (D.S.). It is theoretically possible to obtain cellulose derivatives having a D.S. of 3. Effective adsorbents can be produced, however, having a D.S. substantially lower than this value. With increasing D.S., cellulose derivatized with polar substituents, for the most part, tends to become increasingly water soluble.

Dialkylaminoalkyl derivatives are conventionally prepared in a reaction mixture containing limited amounts of water in order to reduce the extensive degree of hydrolysis that aminoalkylating agents undergo in aqueous systems. Thus, in the preparation of cationic celluloses by etherification low water to cellulose ratios are used in the reaction mixtures, for instance, about six parts of water to one part cellulose. Because of the low proportion of water present, the mixture is a plastic-like mass and requires extensive mixing to obtain intimate contact between the reactants. Relatively large energy expenditures are required to effect this mixing. Larger quantities of water in proportion to the amount of cellulose greatly reduced the reaction efficiency due to hydrolysis of the derivatizing agent with the result that large amounts of the agents are required to achieve the desired degree of substitution. Organic solvents have frequently been used as suspension media for mixing the reactants, but they present certain safety hazards and are costly to use and recover.

There are a number of patents and publications relating to the preparation of derivatized cellulose. U.S. Pat. 3,357,971 to Klug discloses the preparation of mixed ethers of cellulose having a cationic D.S. of from 0.001 to 0.4 and a non-ionic M.S. of 2 (M.S. is the average number of moles of reactant reacted with cellulose per anhydroglucose unit). These products are water soluble which prohibits their use as adsorbent materials. U.S. Pat. 3,095,410 to Anslow discloses the preparation of a diethylaminoethyl (DEAE) cellulose having an ion-exchange capacity of 0.3 to 1.5 milliequivalents per gram. Both of the aforementioned references disclose having present in the reaction mixture low water to cellulose ratios. Publications by Petersen and Sober, J.A.C.S., *78*, 751 (1956) and by Guthrie and Bullock, I / EC, *52*, 935 (1960) also describe methods for preparing adsorptive cellulose products in reaction mixtures having low water to cellulose ratios.

It is an object of the present invention to prepare adsorptive cationic cellulose by a slurry process whereby the cellulose is derivatized by etherification in a reaction mixture having a relatively high water to cellulose ratio.

It is another object of the present invention to prepare adsorptive cationic cellulose by a slurry process whereby cellulose is derivatized by etherification in a reaction mixture having a relatively high water to cellulose ratio under conditions which result in improved reaction efficiency.

It is still another object of the present invention to provide a process for preparing adsorptive cationic cellulose whereby relatively small amounts of derivatizing agents are required to attain the desired degree of substitution.

These objects and other objects of the present invention which will be apparent from the following description are attained in accordance with the present invention by reacting cellulose with a cationic etherifying agent in an alkaline aqueous solution of a salt of a strong acid and a strong base.

Cationic etherifying agents used in the present process may be represented by the following general formula:

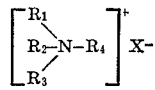

where: $R_1$ and $R_2$ are selected from the group consisting of hydrogen, alkyl, hydroxyalkyl, alkenyl or aryl radicals containing up to 7 carbon atoms; $R_3$ is an alkyl, hydroxyalkyl or alkenyl radical containing up to 6 carbon atoms; $R_4$ is an alkyl or an alkenyl radical having up to 7 carbon atoms, or an alkyl or an alkenyl radical having up to 7 carbon atoms substituted with a chloro, bromo, iodo, or epoxy group; $R_2$ and $R_3$ may be joined to form a nitrogen-containing heterocyclic ring containing up to 6 carbon atoms; X is an anion; $R_1$ and X may be absent in which case the cationic etherifying agent is an uncharged free amine.

Illustrative of examples of compounds of the above type are: 2-dimethylaminoethyl chloride hydrcohloride, 2-diethylaminoethyl chloride, 2 - dimethylaminoisopropyl bromide hydrochloride, 2-diallylaminoethyl chloride, 3-dimethylaminopropyl bromide, 2 - diisopropylaminoethyl chloride hydrochloride, N-(2,3-epoxypropyl) dimethylamine, N-(2,3-epoxypropyl) dibutylamine hydrochloride, N-(2,3-epoxypropyl) piperidine hydrobromide, N-(2,3-epoxypropyl) phenyldimethylammonium chloride, N-(2,3 - epoxypropyl) trimethylammonium chloride, N-(2,3-epoxypropyl) triethylammonium bromide, and N,N - diethylaziridinium chloride.

The preferred etherifying agent is diethylaminoethyl chloride or its hydrochloride.

While a number of cellulosic materials are suitable for etherification by the process of the present invention, it is preferred that the cellulosic material have an alpha cellulose content of at least about 85 percent. There are a number of cellulose products available having varying degrees of porosity as measured by the procedure set forth hereinafter. The initial porosity or porosity of the cellulose prior to derivatization has a significant effect on the degree of DEAE substitution and on the resulting adsorption capacity of the derivatized cellulose. In general, the lower the porosity of the cellulose, the greater its surface area and reactivity, and consequently, the greater the degree of DEAE substitution which can be obtained with a given amount of derivatizing agent and the higher the adsorption capacity of the derivatized cellulose. It is a preferred embodiment of the present invention that the initial porosity of the cellulose be below about 1 and it is a most preferred embodiment that the initial porosity be in the range of from about 0.2 to about 0.05 ml. cm. min.$^{-1}$ g.$^{-1}$. If the initial porosity of the cellulose is very low, the porosity of the DEAE cellulose may be too low to permit easy filtration.

The etherification reaction may be carried out by preparing an alkaline aqueous slurry of cellulosic material having present a salt of a strong base and a strong acid and an etherifying agent of the type described above and maintaining the slurry under suitable reaction conditions.

Generally, the amount of alkali present in the slurry is sufficient to provide from about 0.4 to about 6 moles of alkali per mole of alpha cellulose in the cellulosic material. The molecular weight of alpha cellulose is assigned a value of 162. Preferably, the amount of alkali present in the slurry is sufficient to provide from about 2 to about 4 moles of alkali per mole of alpha cellulose in the cellulosic material and most preferably from about 2.5 to about 3.5 moles of alkali per mole of alpha cellulose.

The proportion of water to cellulosic material in the slurry should be such as to provide a water to cellulose ratio of from about 6:1 to about 25:1 on a weight basis. The preferred ratio is from about 8:1 to about 20:1 and the most preferred ratio is from about 10:1 to about 14:1 on the same weight basis.

The D.S. obtained will be dependent upon the reaction temperature, the reacting period and the amount of cationic etherifying agent used. In general, the longer the etherification reaction is allowed to proceed, the higher will be the D.S. until the etherifying agent is completely consumed.

As noted above, the D.S. of the cellulose should be sufficient to provide an effective cationic adsorbent but insufficient to result in the production of a soluble product. Effective DEAE (diethylaminoethyl) cellulose adsorbents prepared by the present process will typically have an amine D.S. of from about 0.05 to about 0.4. The preferred amine D.S. is from about 0.07 to about 0.3 and the most preferred amine D.S. is from about 0.1 to about 0.2. The amount of cationic etherifying agent added to the cellulose slurry to provide the desired range of amine D.S. will typically be from about 0.2 to about 1.5 moles of etherifying agent per mole of alpha cellulose. The most preferred amount is from about 0.6 to about 0.8 moles of cationic etherifying agent per mole of alpha cellulose.

The concentration of the salt of a strong acid and strong base in the slurry will typically be in the range of from about 0.3 to about 5 molar and preferably from about 1 to about 4 molar. The most preferred salt concentration is from about 2.5 to about 3.5 molar.

The preferred salt of a strong base and strong acid used in the present process is sodium sulfate. The presence of salts of this type in the reaction mixture surprisingly reduces the deleterious effects of water and permits the reaction to be performed at high water to cellulose ratios while maintaining a reaction efficiency comparable to that obtained when lower water to cellulose ratios are used. While the present invention is not limited to any theory, it is thought that the salt of a strong base and a strong acid ties up some of the water present in the slurry, thus reducing hydrolysis of the etherifying agents. A higher water to cellulose ratio results in a more uniform substitution on the cellulose because of the ease with which the slurry may be mixed. Organic solvents have been used to make cellulose ethers but this is not desirable because of the hazards involved and the economics.

In a preferred embodiment of the present invention, non-ionic substituents as well as cationic substituents are introduced onto the cellulose to provide a mixed ether derivative of cellulose. Illustrative of examples of agents for introducing non-ionic substituents are alkylene oxides, e.g., ethylene, propylene or butylene oxides and alkyl halides, e.g., methyl, propyl, benzyl, and allyl chlorides, bromides and iodides. Acrylonitrile may also be used to introduce non-ionic substituents onto the cellulose. The preferred non-ionic agent is ethylene oxide.

The adsorptive mixed cellulose ethers of the present invention will typically have a non-ionic M.S. of from about 0.01 to about 0.5 and preferably of from about 0.08 to about 0.3, the cationic D.S. being as indicated above. To achieve the desired degree of non-ionic substitution in the mixed ether derivative, the amount of non-ionic etherifying agent added will usually be from about 0.02 to about 0.5 moles of non-ionic agent per mole of alpha cellulose and preferably from about 0.1 to about 0.4 moles of non-ionic agent per mole of alpha cellulose.

Generally, it is preferred to react the celulose with the non-ionic agent prior to carrying out the reaction with the cationic etherifying agent. For this purpose, the non-ionic agent and the cationic etherifying agent may be dissolved and added separately to the celulose slurry with stirring, the solution containing the non-ionic etherifying agent being added first. The etherification reaction may be carried out over a relatively wide temperature range but the preferred temperature range is from about 30° to about 80° C.

The introduction of non-ionic groups onto celulose in addition to the presence of cationic substituents results in the formation of a mixed ether derivative of cellulose with increased adsorptive capacity. It is believed that the non-ionic groups have the effect of increasing the available surface area of the cellulose and thereby increasing the availability of the cationic groups.

Since non-ionic derivatizing agents are less expensive than cationic agents, the process of the present invention also provides a more economical method of preparing adsorptive cationic cellulose.

The cationic celulose ethers of the present invention have a high adsorptive capicity for certain proteinaceous materials, such as enzymes. In industrial applications, enzymes are conventionally used in soluble form, which practice largely precludes their continuous use. While it is theoretically possible and economically desirable to recover and reuse soluble enzymes, the economics of so doing has generally made this impractical. When the adsorptive cellulose of the present invention is contacted by an aqueous solution containing an enzyme, e.g., glucose isomerase, the enzyme is adsorbed onto the cellulose and is thereby insolubilized or immobilized.

In order to more clearly describe the nature of the present invention, specific examples will hereinafter be described. It should be understood, however, that this is done solely by way of example and is intended neither to delineate the scope of the invention nor limit the ambit of the appended claims. In the examples and throughout this specification, percentages are utilized to refer to percent by weight unless otherwise stated.

IGIU

IGIU is the abbreviation for International Glucose Isomerase Unit and is that amount of enzyme which will convert 1 micromole of glucose to fructose per minute in a solution initially containing 2 moles of glucose per liter, 0.02 moles of $MgSO_4$ per liter and 0.001 mole of $CoCl_2$ per liter at a pH of 6.84 to 6.85 (0.2M sodium maleate) and a temperature of 60° C. Glucose isomerase determinations were carried out by the method of N. E. Lloyd et al., Cereal Chem., 49, No. 5, pp. 544–553 (1972).

ADSORPTION CAPACITY

Determined by a continuous method in which an aqueous glucose isomerase preparation derived from Streptomyces sp. ATCC 21175, containing about 10 IGIU/ml. is metered at 1.5 ml./min. into a slurry containing 0.5 gram of the cationic celulose ether in 100 ml. of water at pH 7.0. Simultaneously, a small portion of the aqueous phase of the slurry is continuously removed at 0.4 ml./ min. through a filter probe and analyzed continuously for glucose isomerase by the above noted method. As the glucose isomerase preparation is added, the isomerase is continuously adsorbed on the cationic cellulose ether. No appreciable isomerase activity appears in the liquid phase of the slurry until enough isomerase has been added to exceed the adsorption capacity of the cationic cellulose ether. A plot of the glucose isomerase concentration in the aqueous phase of the slurry versus the total amount of isomerase added to the slurry is made and a straight line drawn through the linear portion of the curve is extrapolated to zero concentration of glucose isomerase. The total IGIU adsorbed, at this point, per gram of cationic cellulose ether is the adsorption capacity of the cationic cellulose ether.

INITIAL POROSITY

Fifteen grams of dry cellulose powder is slurried in water and the slurry deaerated by stirring under vacuum for 15 minutes. A glass column (1.5 inches inside diameter, 18 inches high) fitted with a porous glass disc and a stopcock at the bottom is attached to a vacuum flask through a rubber stopper. The flask is in turn attached to a vacuum source. The deaerated slurry of celulose powder is poured into the column and a vacuum (12.3 p.s.i. below atmospheric pressure) is applied to the bottom of the column by opening the stopcock. The cellulose powder is collected on the porous glass disc to form a packed bed. Simultaneously, water is admitted at the top of the column to replace that removed by filtration so that about 5 inches of water is maintained above the packed bed at all times. When a total of 1,000 ml. of water has been collected, the stopcock is closed, the flask removed and the water emptied from the flask. The flask is then reattached to the column, the vacuum reestablished, the stopcock opened and a measured quantity (1,000 to 3,000 ml.) of water is filtered through the packed cellulose bed and collected. The time required to collect the water is determined with a stop watch. The porosity constant is calculated using the following equation:

$$K = (VH)/(TPA)$$

Where:

$K$ = porosity constant (ml. cm. $g^{-1}$ min.$^{-1}$)
$V$ = volume of water collected (ml.)
$H$ = height of packed bed (cm.)
$T$ = time to collect the water (min.)
$P$ = pressure drop across bed ($g$ per square cm.)
$A$ = cross section of bed (square cm.)

EXAMPLE I

This Example illustrates the effect of reacting a cationic etherifying agent with cellulose in an alkaline aqueous solution of sodium sulfate.

64 grams of sodium hydroxide was dissolved in 1620 ml. of water, in the same volume of a 10 percent sodium sulfate solution and in the same volume of a 20 percent sodium sulfate solution. 162 grams of cellulose (BW-40 Solka Floc manufactured by Brown Co., Berlin, N.H.) was blended into each solution and 94.5 grams of diethylaminoethyl chloride hydrochloride, hereinafter referred to as DEC, was slowly sifted into each slurry with stirring. The slurries were heated at 80° C. for a period of 30 minutes with continuous stirring. The slurries of diethylaminoethyl cellulose were cooled, adjusted to a pH of 4 by the addition of a dilute solution of hydrochloric acid, filtered and the filter cakes washed with water. The filter cakes were slurried in water, filtered, and the filter cakes again washed with water. The cakes were dried at a temperature of 170° F. to a moisture content of about 5 percent.

TABLE I.—EFFECT OF SALT CONCENTRATION IN REACTION MIXTURE

| Sodium sulfate (percent) in reaction solution | Amine D.S. of DEAE cellulose | Reaction efficiency (percent)* |
|---|---|---|
| 0 | 0.071 | 13 |
| 10 | 0.096 | 18 |
| 20 | 0.128 | 23 |

*Moles of DEAE substitution per mole of reactant (DEC) ×100.

From the above table it is seen that as the amount of sodium sulfate in the reaction mixture was increased, there was an increase in both the D.S. of the DEAE cellulose and the reaction efficiency.

EXAMPLE II

This Example demonstrates the effect of introducing non-ionic and cationic substituents onto cellulose on the adsorption capacity of the cellulose.

3.5 grams of ethylene oxide was incorporated at ambient temperature into an aqueous slurry containing 54 grams of cellulose (C-100, manufactured by International Filler Corporation, North Tonawanda, N.Y.), 650 grams of water, 390 grams of sodium sulfate and 16 grams of sodium hydroxide. The temperature of the slurry was then increased to 45° C. over a period of 20 minutes and then 25 grams of DEC was added. After stirring for 75 minutes at 45° C., the slurry was cooled, adjusted to a pH of 4 by the addition of the dilute solution of hydrochloric acid, filtered and washed in the manner described in Example I.

Another cationic cellulose was prepared in the manner described above, except that no ethylene oxide was used.

The properties and the adsorption capacity of the celluloses are set forth in Table II below.

TABLE II

| DEC (g.) | Ethylene oxide (g.) | Amine D.S. of DEAE cellulose | Non-ionic M.S. of DEAE cellulose (calculated)* | Adsorption capacity (IGIU, g$^{-1}$ of DEAE cellulose |
|---|---|---|---|---|
| 27 | 0 | 0.11 | 0 | 708 |
| 27 | 3.5 | 0.10 | 0.18 | 1,500 |

*Based on 80 percent of added ethylene oxide reacting with the cellulose to form hydroxyethyl groups.

From the above table it is seen that the introduction of non-ionic groups onto the cationic cellulose increased the adsorption capacity of the cellulose.

EXAMPLE III

This Example illustrates the effect of varying the type of cellulose, reactant ratios, reaction periods and reaction temperatures on the adsorption capacity of the cationic cellulose obtained.

The amounts of the constituents used in the reactions and the conditions under which the reactions were carried out are set forth in Table III, and the results are set forth in Table IV. For the preparation of each sample, a mixture of two different celluloses with a total weight of 50 grams was etherified. Cellulose C-100 was a knife ground softwood cellulose and cellulose BW-40 was a ball milled hardwood cellulose. The cellulose mixture was added to a solution containing the indicated amounts of water, sodium sulfate, and sodium hydroxide (see column headed NaOH$^{(c)}$). The ethylene oxide was added and etherification conducted by stirring the mixture for the time and at the temperature indicated (see under "Ethylene Oxide Reaction Conditions"). At the end of the etherification step with ethylene oxide, additional sodium hydroxide (see under column headed NaOH$^{(d)}$) was added to the reaction mixture, the reaction mixture adjusted to the indicated temperature, the DEC added, and the mixture then stirred for the time indicated (see under "DEC Reaction Conditions"). After etherification with the DEC, the resulting reaction mixture was neutralized, washed, and dried in the manner described in Example I.

TABLE III

| Sample No. | Grams of constituent used | | | | | | | | Ethylene oxide reaction conditions | | DEC reaction conditions | |
|---|---|---|---|---|---|---|---|---|---|---|---|---|
| | Cellulose | | Ethylene oxide | DEC | H₂O | Na₂SO₄ | NaOH c | NaOH d | Temp. (°C.) | Time (hrs.) | Temp. (°C.) | Time (hrs.) |
| | C-100 a | BW-40 b | | | | | | | | | | |
| 1 | 32.5 | 17.5 | 2.7 | 21.3 | 700 | 245 | 5.0 | 9.8 | 45 | 2 | 25 | 2 |
| 2 | 32.5 | 17.5 | 1.4 | 32.0 | 700 | 245 | 2.5 | 19.8 | 45 | 1 | 35 | 1 |
| 3 | 17.5 | 32.5 | 2.7 | 32.0 | 700 | 210 | 2.5 | 19.8 | 55 | 2 | 25 | 2 |
| 4 | 32.5 | 17.4 | 2.7 | 32.0 | 600 | 180 | 2.5 | 27.1 | 45 | 2 | 35 | 1 |
| 5 | 32.5 | 17.5 | 2.7 | 21.3 | 600 | 180 | 5.0 | 9.8 | 55 | 1 | 35 | 1 |
| 6 | 32.5 | 17.5 | 1.4 | 21.3 | 600 | 210 | 2.5 | 17.2 | 55 | 2 | 25 | 2 |
| 7 | 17.5 | 32.5 | 1.4 | 21.3 | 700 | 210 | 5.0 | 17.2 | 45 | 2 | 35 | 1 |
| 8 | 17.5 | 32.5 | 1.4 | 32.0 | 600 | 210 | 5.0 | 17.3 | 55 | 2 | 35 | 1 |
| 9 | 17.5 | 32.5 | 2.7 | 21.3 | 700 | 245 | 2.5 | 17.3 | 55 | 1 | 35 | 1 |
| 10 | 32.5 | 17.5 | 1.4 | 32.0 | 700 | 210 | 5.0 | 24.6 | 55 | 1 | 25 | 2 |
| 11 | 17.5 | 32.5 | 2.7 | 32.0 | 600 | 210 | 5.0 | 24.6 | 45 | 1 | 25 | 2 |
| 12 | 17.5 | 32.5 | 1.4 | 21.3 | 600 | 180 | 2.5 | 12.3 | 45 | 1 | 25 | 2 |
| 13 | 23.0 | 27.0 | 2.3 | 27.4 | 660 | 218 | 3.5 | 20.3 | 48 | 1.5 | 34 | 1 |
| 14 | 21.0 | 29.0 | 2.6 | 28.7 | 670 | 223 | 3.2 | 22.6 | 46 | 1.6 | 38 | 0.9 |
| 15 | 19.0 | 31.0 | 2.8 | 29.8 | 680 | 230 | 3.0 | 25.3 | 44 | 1.6 | 42 | 0.7 |
| 16 | 17.0 | 33.0 | 3.1 | 30.8 | 690 | 235 | 2.7 | 28.1 | 42 | 1.7 | 46 | 0.5 |
| 17 | 15.0 | 35.0 | 3.4 | 31.8 | 700 | 242 | 2.5 | 30.9 | 40 | 1.7 | 50 | 0.5 |
| 18 | 13.0 | 37.0 | 3.7 | 32.8 | 710 | 248 | 2.2 | 33.6 | 38 | 1.7 | 54 | 0.5 |
| 19 | 11.0 | 39.0 | 3.9 | 34.0 | 720 | 254 | 2.0 | 36.7 | 36 | 1.8 | 58 | 0.5 |
| 20 | 9.0 | 41.0 | 4.2 | 35.0 | 730 | 260 | 1.7 | 40.0 | 34 | 1.8 | 62 | 0.5 |
| 21 | 7.0 | 43.0 | 4.5 | 36.1 | 740 | 266 | 1.5 | 43.0 | 32 | 1.9 | 66 | 0.5 |
| 22 | 5.0 | 45.0 | 4.8 | 37.0 | 750 | 274 | 1.2 | 46.4 | 30 | 1.9 | 70 | 0.5 | a Alpha cellulose floc, C-100, International Filler Corp.
b Solka-Floc, BW-40, Brown Company.
c Used in ethylene oxide reaction.
d Used in DEC reaction.

TABLE IV.—RESULTS OF EXPERIMENTS SHOWN IN TABLE III

| Sample number | Amine D.S. of DEAE cellulose | Non-ionic M.S. of DEAE cellulose (calculated)* | Adsorption capacity (IGIU, g⁻¹ of DEAE cellulose) |
|---|---|---|---|
| 1 | 0.09 | 0.16 | 1,300 |
| 2 | 0.14 | 0.08 | 2,460 |
| 3 | 0.11 | 0.16 | 1,900 |
| 4 | 0.16 | 0.16 | 2,800 |
| 5 | 0.10 | 0.16 | 1,360 |
| 6 | 0.11 | 0.08 | 1,230 |
| 7 | 0.12 | 0.08 | 2,430 |
| 8 | 0.15 | 0.08 | 1,900 |
| 9 | 0.11 | 0.16 | 2,400 |
| 10 | 0.12 | 0.08 | 1,450 |
| 11 | 0.15 | 0.16 | 2,540 |
| 12 | 0.09 | 0.08 | 1,220 |
| 13 | 0.13 | 0.14 | 2,380 |
| 14 | 0.14 | 0.15 | 2,680 |
| 15 | 0.14 | 0.17 | 2,700 |
| 16 | 0.15 | 0.18 | 2,780 |
| 17 | 0.16 | 0.20 | 3,020 |
| 18 | 0.16 | 0.22 | 3,030 |
| 19 | 0.17 | 0.23 | 3,150 |
| 20 | 0.17 | 0.25 | 3,560 |
| 21 | 0.17 | 0.26 | 3,420 |
| 22 | 0.17 | 0.28 | 2,970 |

*Based on 80 percent of the added ethylene oxide reacting with the cellulose to form hydroxyethyl groups.

EXAMPLE IV

This Example illustrates the effect of initial porosity of various celluloses obtained from a number of sources on the degree of DEAE substitution and adsorption capacity for glucose isomerase of the derivatized cellulose.

Six samples of cellulose having varying initial porosities were derivatized in the following manner: 23 grams of sodium hydroxide was dissolved in 440 ml. of a 20 percent sodium sulfate solution. 54 grams of dry substance cellulose was blended into the alkali salt solution with vigorous stirring. 34.4 grams of DEC dissolved in 100 ml. of a 20 percent sodium sulfate solution was added slowly to the alkali cellulose slurry with stirring. The cellulose-DEC slurry was then heated at 60° C. for one hour with continuous stirring. The reaction mixture was neutralized to pH 4 with dilute HCl and filtered and the derivatized cellulose on the filter was washed with water. The filter cake was reslurried in fresh water, and the slurry filtered. The derivatized cellulose was then rinsed with water and dried at 170° F. to a moisture content of about 5 percent.

The initial porosity, degree of DEAE substitution and adsorption capacity for glucose isomerase obtained for the various celluloses are shown in Table V.

TABLE V

| Cellulose source | Initial porosity, ml. cm. g⁻¹ min⁻¹ | DEAE DS. | Adsorption capacity, IGIU/g. |
|---|---|---|---|
| (1) | BW-40 | 0.10 | 0.14 | 2,324 |
| (2) | SW-40 | 0.16 | 0.12 | 1,330 |
| (3) | C-100 | 0.60 | 0.13 | 1,770 |
| (4) | RB-100 | 0.80 | 0.10 | 1,050 |
| (5) | BH-40 | 0.07 | 0.14 | 2,240 |
| (6) | Cotton-80* | 0.10 | 0.13 | 2,100 |

*Ground to pass through an 80 mesh U.S. Standard screen.
Identification of celluloses:
(1) and (2), Brown Company.
(3) (4) and (5), International Filler Corp.
(6) ER 1600, Buckeye Cellulose Corp.

From the results shown in the above table it is apparent that, in general, the celluloses having lower initial porosity had greater degrees of DEAE substitution and higher adsorption capacities for glucose isomerase.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

What is claimed is:

1. A method for preparing adsorptive cationic cellulose comprising reacting cellulose with a cationic etherifying agent in an alkaline aqueous solution containing an amount of a salt of a strong acid and a strong base sufficient to increase the reaction efficiency between the cationic etherifying agent and the cellulose, wherein the cationic etherifying agent is represented by the following general formula:

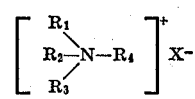

where: $R_1$ and $R_2$ are selected from the group consisting of hydrogen, alkyl, hydroxyalkyl and alkenyl or aryl radicals containing up to 7 carbon atoms; $R_3$ is an alkyl, hydroxyalkyl or alkenyl radical containing up to 6 carbon atoms; $R_4$ is an alkyl or an alkenyl radical having up to 7 carbon atoms, or an alkyl or alkenyl radical having up to 7 carbon atoms substituted with a chloro, bromo, iodo, or epoxy group; $R_2$ and $R_3$ may be joined to form a nitrogen-containing heterocyclic ring containing up to 6 carbon atoms; X is an anion; $R_1$ and X may be absent in which case the cationic etherifying agent is an uncharged free amine.

2. A method for preparing adsorptive cationic cellulose as defined in Claim 1, wherein, the etherifying agent is diethylaminoethyl chloride or the hydrochloride thereof.

3. A method for preparing adsorptive cationic cellulose as defined in Claim 2, wherein the salt of a strong acid and a strong base is sodium sulfate.

4. A method for preparing adsorptive cationic cellulose as defined in Claim 1, wherein the cellulose is also reacted with an agent capable of introducing non-ionic substitutents onto the cellulose.

5. A method for preparing adsorptive cationic cellulose as defined in Claim 4, wherein the agent capable of introducing non-ionic substituents on the cellulose is ethylene oxide.

6. A method for preparing adsorptive cationic cellulose as defined in Claim 4, wherein the cellulose is reacted with diethylaminoethyl chloride or the hydrochloride thereof under conditions such that the cationic cellulose as a D.S. of from about 0.05 to about 0.4.

7. A method for preparing adsorptive cationic cellulose as defined in Claim 4, wherein the cellulose is reacted with diethylaminoethyl chloride or the hydrochloride thereof under conditions such that the cationic cellulose has a D.S. of from about 0.07 to about 0.30.

8. A method for preparing adsorptive cationic cellulose as defined in Claim 1, wherein the cellulose is reacted with an agent capable of introducing non-ionic substituents onto the cellulose under conditions such that the resulting cationic cellulose has a non-ionic M.S. of from about 0.01 to about 0.5.

9. A method for preparing adsorptive cationic cellulose as defined in Claim 8, wherein the cellulose is reacted with an agent capable of introducing non-ionic substituents onto the cellulose under conditions such that the resulting cationic cellulose has a non-ionic M.S. of from about 0.08 to about 0.3.

10. A method for preparing adsorptive cationic cellulose as defined in Claim 9, wherein the cellulose has an initial porosity, of below about 1 ml. cm. $G^{-1}$ min.

11. A method for preparing adsorptive cationic cellulose as defined in Claim 10, wherein the cellulose has an initial porosity, of from about 0.2 to about 0.05 ml. cm. $G^{-1}$ min.$^{-1}$.

References Cited
UNITED STATES PATENTS

| | | | |
|---|---|---|---|
| 1,863,208 | 6/1932 | Schorger | 260—231 A |
| 3,095,410 | 6/1963 | Anslow | 260—231 A |
| 3,337,531 | 8/1967 | Wakeman et al. | 260—215 |
| 3,357,971 | 12/1967 | Klug | 260—215 |
| 3,359,258 | 12/1967 | Toms | 260—231 A |
| 3,494,719 | 2/1970 | Soignet et al. | 260—231 A |
| 3,526,475 | 9/1970 | Soignet et al. | 260—120 |
| 3,676,423 | 7/1972 | Elizer | 260—215 |

MAURICE J. WELSH, Primary Examiner

R. W. GRIFFIN, Assistant Examiner

U.S. Cl. X.R.

8—120; 260—215

UNITED STATES PATENT OFFICE
CERTIFICATE OF CORRECTION

Patent No. 3,823,133　　　　　　　Dated July 9, 1974

Inventor(s) Louis S. Hurst and Norman E. Lloyd

It is certified that error appears in the above-identified patent and that said Letters Patent are hereby corrected as shown below:

Column 1, line 57; "reduced" should read --reduce--.

Column 2, line 48; "2-dimethylamino-ethyl chloride hydrocohlride" should read -- 2-dimethylamino-ethyl chloride hydrochloride --.

Column 4, lines 16, 20, 26, 37 and 74; "celulose" should read --cellulose--.

Column 5, line 25; "celulose" should read --cellulose--.

Column 6, line 28; "the dilute solution" should read --a dilute solution--.

Column 8, Table V, line 31; delete comma after "$g^{-1}$".

Column 8, Table V, line 32; "DS." should read --D.S.--.

Column 9, line 12; "substitutents" should read --substituents--.

Column 9, line 21; "as" should read --has--.

Column 10, line 9; between "porosity" and "of" delete comma; "$G^{-1}$ min." should read --$g^{-1}$ min$^{-1}$--.

Column 10, line 12; between "porosity" and "of" delete comma.

Column 10, line 13; "$G^{-1}$" should read --$g^{-1}$--.

Signed and sealed this 3rd day of December 1974.

(SEAL)
Attest:

McCOY M. GIBSON JR.　　　　　　C. MARSHALL DANN
Attesting Officer　　　　　　　　Commissioner of Patents